UNITED STATES PATENT OFFICE.

VICTOR ALPENBURG AND LOUISE ALPENBURG, OF NEW YORK, N. Y., ASSIGNORS TO FRANCESCO BIANCHI, OF SAME PLACE.

ARTIFICIAL FLOWER.

SPECIFICATION forming part of Letters Patent No. 419,746, dated January 21, 1890.

Application filed March 18, 1889. Serial No. 303,769. (No specimens.)

*To all whom it may concern:*

Be it known that we, VICTOR ALPENBURG, a citizen of the United States, and LOUISE ALPENBURG, his wife, both residing in the city and county of New York, in the State of New York, have invented a certain new and useful Improvement in the Manufacture of Artificial Flowers; and we do hereby declare that the following is a full and exact description thereof.

Our improvement relates to the material from which the petals are formed and to the treatment thereof. We have discovered means whereby we can imitate with great perfection the soft and leathery condition of the corresponding members of natural flowers and can cause these qualities to be retained and also the form of the natural petals to be maintained for a long period.

We take Chinese rice paper, sometimes known as "papyrifera," and soak it from one and a half to two hours in a solution and dry it for about the same period in the shade, the time required for the drying or partial drying which is desired varying with the temperature and the hygrometric condition of the air.

The solution is prepared as follows: Take four quarts of distilled or rain water and dissolve in it a mixture of four (4) ounces of saltpeter, (nitrate of potash,) four (4) ounces of alum, (sulphate of alumina and potash,) and four (4) ounces of carbonate of potassium, (in German, *Kohlens aures kali*,) pulverized together. The pulverized and mixed materials are thrown into the water and thoroughly stirred, and then the mixture is boiled for half an hour or more and allowed to stand quiet until cooled down to about blood heat, and then filtered through muslin. To the clear solution thus obtained we add at this temperature eight (8) tea-spoonfuls of wood-alcohol and one ounce of refined glycerine. The quantity of glycerine may be increased or diminished in some cases. It is important that the quantity should be sufficient to give a slightly-slippery feeling when rubbed in the fingers; but it should not be much in excess of that condition. It will usually be about one ounce of commercial glycerine to the quantity of the other materials named. The solution thus made may be kept for a long period at any ordinary temperatures, and may be used at any ordinary temperatures; but we have in our experiments generally used it without much delay and at about blood heat. The rice paper, after lying in this solution about two hours, is drained and gently pressed with the hands to express the excess before drying. After it has been extended in single sheets and exposed in a warm dry room about two hours it is ready to be colored. It will take any tint from the ordinary aniline dyes by simple immersion; but the dyes should also be prepared with a small quantity of wood-alcohol and glycerine. To one gallon of dye there should be added about twelve (12) ounces of the alcohol and twelve (12) ounces of the glycerine. The dye being gently pressed out, the prepared and properly-tinted paper, being now extended in sheets and again dried in the shade two hours or more, is ready to be cut by dies or by any other means to the forms required.

In finally making up the flowers the several pieces of the material are lightly dipped along the edges in melted wax—ordinary beeswax—and then rolled in the fingers, shaped, and otherwise treated to induce the desired dishing, curled, or veined condition. The leaves or petals may be united by flour paste or other cementing material, about the same as those made of ordinary material, and the flowers may be handled as roughly and used in all respects like other artificial flowers, and will endure as well, with the difference that our flowers exhibit a condition more closely resembling nature than any artificial flowers before known to us.

We have in our experiments used the material commonly known in the paper trade as "rice paper." We have been informed and believe that it is made in China from the inner parts of the bark of a tree or shrub cut in thin lamina and joined or sized with a cementing material made from rice; but of this we cannot be certain. We have tried other material, but have not succeeded perfectly except with the material commercially known by that name.

We claim as our invention—

1. In the manufacture of artificial flowers, the method described of treating rice paper or analogous material in a solution of saltpeter, alum, and carbonate of potassium, coloring in a dye in the presence of wood-alcohol and glycerine, and finally treating with wax, all substantially as herein specified.

2. The method described of treating rice paper or analogous material in a solution, drying, coloring in a dye and drying, cutting to the forms required, waxing the edges, and finally shaping mechanically to the dishing, curled, or veined condition desired, as herein specified.

3. An artificial flower having the petals of rice paper saturated and dyed and shaped to the required form and having the edges waxed, as herein specified.

In testimony whereof we have hereunto set our hands at New York city, New York, this 11th day of March, 1889, in the presence of two subscribing witnesses.

VICTOR ALPENBURG.
LOUISE ALPENBURG.

Witnesses:
   ISIDOR GRUNWALD,
   CHARLES R. SEARLE.